United States Patent Office 2,936,240
Patented May 10, 1960

2,936,240

TREATMENT OF LIQUID WHOLE EGGS

Floyd L. Kauffman, Palos Park, and Leon D. Mink, Chicago, Ill., assignors to Swift & Company, Chicago, Ill., a corporation of Illinois No Drawing. Application December 10, 1953
Serial No. 397,474

7 Claims. (Cl. 99—196)

The present invention relates to the treatment of whole eggs for the purpose of providing an improved frozen egg product. More specifically, the invention is directed to the production of an improved egg product by pasteurization and homogenization of whole eggs prior to the freezing thereof.

In the pasteurization of eggs it is necessary to utilize comparatively high temperatures in order to kill the bacteria present and thereby alleviate subsequent spoilage occurring during storage due to bacterial growth. This latter result is highly detrimental as that portion of the stored eggs which becomes spoiled is no longer fit for use. The temperatures utilized in pasteurization should be sufficiently high so as to kill salmonella bacteria, but in the utilization of such temperatures, such as 140° F., for several minutes, a change in the characteristics of the egg constituents results which, if maintained in the final product, is highly undesirable.

Commercial storage of whole eggs presents many problems which heretofore have not been solved. In the conventional freezing of batches of whole eggs on a commercial scale, much spoilage has been present due to bacterial growth. Fresh eggs processed for storage on a commercial scale must be handled in comparatively large batches in order to expedite the processing of a considerable number of eggs. These large batches must also be processed in as short a time as possible due to the volume processed and the necessity of expediency which is required to alleviate spoilage. In the process of freezing whole eggs it has heretofore been proposed to pasteurize the eggs prior to freezing for the purpose of destroying bacteria and thereby reducing spoilage occurring during subsequent treatment. Such pasteurization has been carried out, however, at temperatures not sufficiently severe to destroy all harmful bacteria because of the necessity of avoiding any deleterious change in the physical characteristics of the egg constituents. Physical changes resulting from high temperature treatment are carried over into the final frozen product, and when the resulting eggs are utilized in bakery products, such changes produce unsatisfactory results. Commercial batches, due to their size, require a substantially long period of time to be reduced to a frozen state. The center portion of the batch, treated in the conventional manner, is slow in freezing, and because of this, more incubation time is provided for bacterial growth. As a result, the center portion of these batches are quite often spoiled.

It is therefore an object of this invention to provide an improved frozen egg product.

It is a further object to subject whole eggs to a treatment which allows the use of high pasteurization temperatures.

Further objects, if not specifically set forth herein, will appear clear from the following detailed description:

Generally, the present invention comprises the treatment of whole eggs, prior to the freezing thereof, by pasteurization of the eggs at a high temperature, followed by cooling and subsequent homogenization of the eggs. The resultant frozen product maintains its fresh condition during storage, and when used in bakery products results in an increased volume yield of bakery products.

It has been found that by the incorporation of an homogenization step following pasteurization in the process of freezing whole eggs, high pasteurization temperatures may be used without the resultant frozen product exhibiting undesirable physical characteristics, and without spoilage occuring due to bacterial growth. The use of higher temperatures sufficiently destroys bacteria to allow the usual batch freezing to take place without resultant harmful bacterial growth.

It has also been found that an increased volume of bakery product may be obtained according to the teachings of the present invention. Not only does the resultant egg product provide a bakery product of equivalent volume to that resulting from the use of fresh eggs, but an increase of volume heretofore unattainable is realized. The theory behind this unexpected increase in volume is not known at the present but it is clear that the resultant frozen product is highly desirable inasmuch as bacterial growth sufficient to result in spoilage is alleviated, undesirable modification of egg constituents is overcome, and an increased volume of bakery product heretofore unattainable is realized.

Following the teachings of this invention, whole fresh eggs are pasteurized at temperatures of about 140° F. for several minutes. These temperatures are sufficiently severe to kill bacteria which, if allowed to grow, would result in egg spoilage. The bacteria killed includes the undesirable salmonella bacteria. The whole eggs are then allowed to cool. Upon sufficient cooling the eggs are homogenized under sufficient pressure to insure a uniform composition. Following this, the eggs are frozen and stored. Upon subsequent thawing of the whole eggs, it has been found that the cake volume test, i.e., a conventional measure of the baking properties, shows a marked increase in volume from eggs treated in accordance with the present invention over conventionally-treated frozen eggs. It is also apparent that this increased volume is clearly unexpected in view of the fact that the eggs have been pasteurized at a high temperature.

It has been found that in the pasteurization step utilized in this invention the most desirable temperature range is that of 138° F. under atmospheric pressure. During homogenization the most desirable pressure range is from 1000 to 5000 p.s.i. and the temperature usually runs about 50° F. or below. The cooling step is considered necessary because if pasteurization temperatures are maintained for more than several minutes, coagulation occurs. In order to overcome coagulation it has been found desirable to "flash" heat and "flash" cool. This may be done by bringing the whole eggs to within the desired pasteurization temperature range as fast as possible. The "flash" cooling is brought about by cooling the pasteurized whole eggs as quickly as possible. By following this procedure the eggs are subjected to coagulation temperatures over a very short period of time. In cooling the pasteurized eggs it is preferred that the temperature be reduced to approximately 50° F. or within the range of 32° to 60° F. This procedure removes the eggs from the bacterial growing temperature range and thereby further aids in the maintainance of a pasteurized product.

Comparative tests were run wherein (a) unpasteurized eggs, (b) pasteurized but not homogenized eggs, and (c) eggs treated according to the teachings of this invention were used. The groups of eggs so treated were frozen, stored, and subsequently used in the production of sponge cake. The ingredients, and their amounts, used in the sponge cakes were as follows:

1. ⅛ oz. salt
   1 lb. granulated sugar
   1 lb. whole eggs
   2 oz. water 2. 2 oz. cornstarch
   8 oz. cake flour 3. 5 cc. vanilla The ingredients listed under 1 were heated by means of a warm water bath to a temperature of 75° F. They were then whipped and the vanilla under 3 was added and mixed. The ingredients under 2 after having been sifted together three times were added and mixed into the prior mixture. The completed mixture was then baked for 35 minutes at 360° F. The homogenization in (c) was carried out at 3000 pounds pressure. The following comparative results were noted:

Table I

| Pasteurization Conditions | | Sponge Cake Volume (ml.) | | |
|---|---|---|---|---|
| Temp. (° F.) | Time (Min.) | Control | Homogenized | Gain |
| Not Pasteurized | | 2,150 | 2,200 | 50 |
| 140 | 3 | 2,130 | 2,180 | 50 |
| 142 | 3 | 2,130 | 2,210 | 80 |
| 145 | 3 | 2,050 | 2,120 | 70 |
| 150 | 3 | 1,990 | 2,090 | 100 |

Additional tests were run wherein the pressure utilized during homogenization was varied. In these tests the same procedure was followed as stated above, and the frozen treated eggs were stored for 60 days at a temperature of —6° F. The comparative results are shown in the table below:

Table II

| Pasteurization | | Homogenization Pressure (Lbs.) | Sponge Cake Volume (ml.) |
|---|---|---|---|
| Temp. (° F.) | Time (Min.) | | |
| Not Pasteurized | | None | 2,140 |
| 140 | 4 | None | 2,035 |
| 140 | 4 | 100 | 2,050 |
| 140 | 4 | 1,000 | 2,215 |
| 140 | 4 | 3,500 | 2,245 |

It should be noted that, from the information shown in Table II, the batch which was homogenized at 3500 pounds pressure showed an increase of cake volume of 210 ml. over the batch which was pasteurized only and not homogenized.

The present invention may be carried out in any suitable apparatus used in the art. The preferred apparatus consists of well-known equipment, hereinafter described for purposes of illustration. For example, a small vat style pasteurization unit may be used. This unit consists merely of a circular can equipped with an agitator in which the eggs are placed. The can is partially submerged in a water bath which is maintained at the desired temperature, and the eggs are pasteurized within the can while subjected to agitation. During homogenization the components of the eggs are thoroughly dispersed and mixed, thereby providing uniformity in the final product. As a result, a more fluid system having a lowered viscosity is produced, made up of particles having been generally reduced in size. The homogenization step may be carried out in conventional equipment such as a sanitary "Viscolizer." The "Viscolizer" is essentially a high-pressure pump capable of pumping liquid under a pressure up to 10,000 pounds per square inch and is provided with additional means whereby the liquid is required to pass through an exceedingly narrow slip or opening commonly known as an homogenizing valve. The pressure at which the liquid is pumped is regulated by the closure of the homogenizing valve. In order to produce a more uniform flow and pressure the homogenizers are constructed with three cylinders so that there may be a forward thrust of at least one piston at all times. Other apparatus capable of supplying the required operating conditions may be used.

A typical example of the utilization of the process is set forth below for the purpose of illustration only, and is not to be construed as placing any limitation on the scope of the present invention:

A batch of raw eggs was removed from their shells and placed into a vat style pasteurization unit. The whole eggs were heated to 140° F. under atmospheric pressure for 4 minutes during which time agitation of the eggs was maintained. The batch was then cooled to 50° F. and subsequently introduced into an homogenizer. The homogenizer used was a "Viscolizer" which homogenized the whole eggs at a pressure of 3500 pounds per square inch. The pasteurized and homogenized eggs were then frozen and stored. Storage temperature was maintained at —6° F. and storage time was 60 days. The batch was then defrosted and used in the baking of sponge cakes. The resultant cakes showed an increase in volume of approximately 210 ml. in comparison with the volume of sponge cakes prepared from frozen whole eggs having been pasteurized solely and not homogenized.

By reference to whole eggs in the specification and appended claims is meant the entire liquid egg in its natural appearing condition, which includes the white and the yolk of the egg.

Obviously, many modifications and variations of the invention as hereinbefore set forth may be made without departing from the spirit and scope thereof, and therefore only such limitations should be imposed as are indicated in the appended claims.

We claim:

1. In the treatment of liquid whole eggs prior to the freezing thereof, the improvement comprising heating said liquid whole eggs for several minutes at egg pasteurization temperatures, cooling said eggs to prevent coagulation, and thereafter pumping said eggs under pressure of at least about 1000 pounds to thoroughly disperse and mix said eggs.

2. In the treatment of liquid whole eggs whereby an increased volume of bakery products results in the subsequent use thereof, the improvement comprising heating said liquid whole eggs for four minutes at 140° F., cooling said eggs to below about 60° F., and thereafter pumping eggs under pressure of about 3500 pounds to thoroughly disperse and mix said eggs.

3. In the treatment of liquid whole eggs prior to the freezing thereof, the improvement comprising: applying heat to a batch of liquid whole eggs whereby said whole eggs are pasteurized without coagulation, cooling said pasteurized eggs, and thereafter pumping said eggs under pressure whereby said pasteurized whole eggs are homogenized.

4. In the treatment of liquid whole eggs whereby an increased volume of bakery products results in the subsequent use thereof, the improvement comprising: heating liquid whole eggs to a relatively high temperature whereby said whole eggs are pasteurized without coagulation, cooling said pasteurized eggs, pumping said eggs under pressure whereby said pasteurized whole eggs are homogenized, and thereafter freezing said treated whole eggs.

5. In the treatment of liquid whole eggs prior to the freezing thereof whereby bacterial growth and coagulation is substantially reduced, the improvement comprising: applying substantial heat to a quantity of liquid whole eggs whereby said whole eggs are pasteurized without coagulation, cooling said eggs, and pumping said eggs under pressure whereby said pasteurized eggs are homogenized.

6. In the treatment of liquid whole eggs prior to the freezing thereof, the improvement comprising: applying heat to said whole eggs at a temperature of between about 140° F. and about 150° F. and maintaining said temperature for a sufficient period of time to pasteurize said whole eggs without coagulation, cooling said whole eggs, and pumping said eggs under pressure whereby said pasteurized eggs are homogenized and bacterial growth and coagulation are greatly reduced.

7. In the treatment of liquid whole eggs whereby bacterial growth and coagulation is greatly reduced, the improvement comprising: applying heat to said whole eggs at a temperature of at least about 140° F. for several minutes whereby said whole eggs are pasteurized without coagulation, cooling said pasteurized whole eggs to below about 60° F., pumping said eggs under pressure whereby said pasteurized eggs are homogenized, and thereafter subjecting said eggs to freezing temperatures prior to the storage thereof.

References Cited in the file of this patent

UNITED STATES PATENTS

| | | |
|---|---|---|
| 1,870,269 | Tressler | Aug. 9, 1932 |
| 2,093,786 | Swarthout et al. | Sept. 21, 1937 |
| 2,458,449 | Urbain et al. | Jan. 4, 1949 |
| 2,479,310 | Chapin | Aug. 16, 1949 |
| 2,565,311 | Koonz et al. | Aug. 21, 1951 |

OTHER REFERENCES

Food Technology, November 1952, pp. 414 and 415, article entitled Production of Pasteurized Frozen Egg Products.